3,330,693

METHOD OF MAKING A MAGNETIC RECORD MEMBER WITH ENCAPSULATED FERROMAGNETIC PARTICLES IN A BINDER AND RESULTING PRODUCT

George G. Rumberger, Kalamazoo, Mich., assignor to Pateco, Kalamazoo, Mich., a partnership No Drawing. Filed Oct. 29, 1962, Ser. No. 233,915
6 Claims. (Cl. 117—161)

The present invention relates to ferromatic particles and is more particularly concerned with individually encapsulated ferromagnetic particles, with a magnetic impulse record carrier employing individually encapsulated ferromagnetic particles, and with a method of making the same.

During recent years the demand for magnetic impulse record carriers, e.g., discs, sheets, cylinders, moving picture films, electronic computer components, telemetering equipment, bands, audio and video tapes, and the like, has increased tremendously. Generally, the carrier comprises a ferromagnetic material such as particles of iron oxide or a ferric alloy embedded in a non-magnetizable polymer binder adhesively secured or bonded to a non-magnetic backing. Great strides have been made in improving the recording qualities of such magnetic impulse record carriers during the past decade. For example, noise level has been reduced and sensitivity has been increased by reducing the size of the iron oxide particles, by magnetically orienting the particles in the binder, by increasing the remanence ($B_r$) of the ferromagnetic, e.g., iron oxide, particles, and the like.

The magnetic record carriers heretofore employed have not been entirely satisfactory, however, especially since holes and blurps are still produced in the recordings, depending upon the local concentration or agglomeration of ferromagnetic particles embedded in the binder. Evidently, even though dispersing agents, such as derivatives of phosphoric acid, are introduced into the binder to distribute more uniformly the particles, some of the particles still touch each other, agglomerate, or form voids. This problem has given rise to a requirement that the speed of the carrier employed for sound or data recording and/or transmission exceed a factor of the recording or bias frequency and number of ferromagnetic particles per unit length of carrier. Otherwise, the problem has not been adequately solved up to the present time. However, according to the present invention, it has now been found that ferromagnetic particles can be evenly spaced and yet precluded from touching each other if each of the discrete particles are insulated from each other before being suspended in the binder. I accomplish this result by encapsulating the individual discrete ferromagnetic, e.g., oxide, iron particles with a non-magnetic polymeric coating.

Several methods are known for the production of ferromagnetic particles, e.g., magnetizable iron oxide particles, preferably gamma ferric oxide, $Fe_2O_3$. For example, alpha ferric oxide may be reduced to magnetite and then oxidized to the end product or the end product may be produced synthetically by preparing a seeding material from ferric salts and growing the iron oxide particles under controlled conditions upon the seeding material. The iron oxide particles are usually ground dry or in a solution of a vehicle and a solvent to reduce the size of the particles. In either grinding operation, however, the ground particles are not uniformly reduced in size since, during grinding of the slurry, the vehicle and solvent act as a lubricant and prevent an even distribution of particle sizes. Frequently lumps or nodes of oxide form and are difficult if not impossible to reduce in size. Moreover, in subsequent filtration, the high viscosity of the iron oxide-vehicle slurry generally makes separation of the nodes, and even smaller particles, difficult. I have now discovered that the ferromagnetic, e.g., iron oxide, particles may be ground in aqueous media, preferably water, to a fine and even state of subdivision and that, so long as the ground particles are not removed from the aqueous media, they do not tend to clump together. I have also found that the discrete particles may be individually encapsulated while still in the water suspension, the encapsulation particles separted from the water in a simple and facile manner, redispersed uniformly in a non-magnetizable binder, and then applied in the binder to a non-magnetic backing.

Accordingly, it is an object of the present invention to provide an improved magnetic impulse record carrier.

Another object of the present invention is to provide individually encapsulated ferromagnetic particles for a magnetic impulse record carrier.

A further object is to provide a thin coating of polymeric material around individual discrete particles of iron oxide while still in water suspension.

Still another object is the provision of a process for making an improved magnetic impulse record carrier.

Still a further object is the provision of a process of treating ferromagnetic, e.g., iron oxide, particles which comprises individually encapsulating the particles with a polymer under aqueous conditions, separating the encapsulated particles from the aqueous medium, and applying the particles to a non-magnetic backing with a non-conductive binder.

Additional objects and advantages of the present invention will be apparent to one skilled in the art and still other advantages will become apparent hereinafter.

To the accomplishment of the foregoing and related ends, the present invention then comprises the features hereinafter fully described and particularly pointed out in the claims, the following description setting forth in detail certain illustrative embodiments of the invention, being indicative, however, of but several of the ways in which the principles of the invention may be employed.

Briefly, the present invention is concerned with ferromagnetic particles, with magnetic impulse record carriers employing or embodying such particles, and with the preparation thereof. The ferromagnetic particles are prepared in an aqueous suspension by grinding or milling in water until a desired fine degree of dispersion is attained. A thin layer of polymer is then formed around the individual discrete ferromagnetic particles while still in the aqueous medium to prevent the discrete particles from coalescing. The particles, individually encapsulated in a polymeric shell thus formed, may be readily freed from water, since the polymer is insoluble in water, as by filtration and dehydration or by solvent replacement. After the individually encapsulated ferromagnetic particles are thus prepared, they may be isolated and redispersed in the selected vehicle. The vehicle employed may be compatible with the polymer encapsulating the individual particles, but in a preferred form it is desirable to employ a vehicle which has only limited compatibility with the polymer. This may be controlled by choice of the binder or solvent system.

Considering the invention in detail, ferromagnetic, e.g., iron oxide, particles are suspended in an aqueous solution and milled or ground to reduce the average diameter of the particles. Grinding of the particles may be accomplished by employment of a ball mill or any other suitable equipment which will produce the effect of mortar and pestle. The grinding period generally depends upon the initial size of the particles, the density thereof, and the properties desired in the end product. It is well known that an increase in density and a decrease in particle size increases the remanence ($B_r$) of ferromagnetic particles and that, the higher the remanence, the greater the sensitivity. The properties desired will depend upon the application of the record carrier to contain the particles, that is, whether the particles will be utilized in an expensive video tape, an inexpensive audio recording tape, and so on, especially since the end use or application dictates the cost of both final and intermediate products.

After the ferromagnetic particles are ground to the proper size, the slurry which results from grinding may be diluted as with additional water, and a polymerizable monomer, usally in an amount less than the weight of the particles to be coated, added. The slurry is agitated to uniformly distribute the monomer, and, preferably while the monomer is uniformly distributed, a catalyst is added to the slurry. Any one of numerous catalysts or catalyst systems may be employed, e.g., the free radical type such as hydrogen peroxide, benzoyl peroxide, or cumene hydroperoxide, or the redox system such as ferrous sulphate plus either hydrogen peroxide or ammonium persulfate, or an amine-peroxide, depending upon the particular monomer used. Moreover, the catalyst may consist of or comprise ultra-violet, gamma, or X-ray radiation, or may be of the ionic type such as ceric sulphate. The slurry of ferromagnetic particles, polymerizable monomer, and selected catalyst may then be heated, for example to about 90° centigrade, with agitation, and maintained under polymerization conditions until a film of polymer surrounds the individual ferromagnetic, e.g., ion oxide, particles. The monomer and catalyst may be added in any order or together, under or prior to effecting polymerization conditions, so long as the monomer and particles to be coated are suitably dispersed and preferably agitated so as to produce a uniform coating. The amount of monomer used determines the thickness of the film. Agitation may be continued while cooling the mixture to ambient temperature. The particles are separated from the water by settling, filtration, or centrifugation, followed by drying. When the coated particles are examined under a microscope, the individual particles are found to be evenly coated and enclosed in a non-magnetic polymeric shell. The coated or encapsulated particles are then suspended in a suitable non-conductive or non-magnetizable binder, e.g., a solvent solution of plasticized polyvinylidene chloride, nylon, an alkyd resin, or the like, which is applied in a uniform thickness to a non-magnetic backing. While the binder is still in fluid form, the backing is preferably passed through an unidirectional magnetic field for orientation of the encapsulated ferromagnetic, e.g., iron oxide, particles thereon. The binder or coating on the backing may then be dried, calendered, compressed, and burnished before being slit and put on reels.

It has been found that a smaller amount of binder is necessary for a specified amount of ferromagnetic, e.g., iron oxide, particles when in the encapsulated form than for the same quantity of ferromagnetic particles available from prior art procedures, without decreasing the strength of the binder. Apparently, the polymeric shell prevents internal absorption of the binder and additionally reinforces the vehicle. In some applications, the polymeric material itself has adequate adhesive properties to bind the encapsulated ferromagnetic particles together into a coherent mass on the backing. Since the particles are individually encapsulated, the number of particles per square inch of backing may be increased without having the particles interfere with each other. Moreover, the concentration of the particles on the non-magnetic backing is more uniform, and agglomeration, touching of the particles against each other, and voids on the backing are eliminated. Thus, when the tape is employed, e.g., for video or audio recording, no holes of blurps are produced, and sensitivity is increased, which among other things enables lowering of the tape without reducing the quality of the recording.

The following examples are given for purposes of illustration only, and are not to be construed as limiting.

*Example 1*

A charge of brown iron oxide having an average particle diameter of fifteen microns and a maximum particle diameter of thirty microns, weighing fifty grams, is charged into a ball mill with 150 grams of distilled water and milled for 24 hours, after which period the average particle diameter is three microns and the maximum particle diameter is seven microns. In other runs, the size of the ground particles varied from one to three microns average particle diameter with maximum particle diameter of seven microns. After milling, the batch is diluted with an additional 500 grams of water, fifty grams of vinyl acetate are added thereto, and the batch is stirred violently for ten minutes. Six-tenths (0.6) gram of hydrogen peroxide is then added, and the reaction mixture is heated to about 90° centigrade while stirring. Reflux temperature is maintained for twenty minutes, and the reaction product allowed to cool while stirring. The resultant product is a brown suspension, which is separated from the water by settling, filtration or centrifugation, followed by drying. The individually polyvinyl acetate-encapsulated iron oxide particles are then suspended in a solvent solution of plasticized polyvinylidene chloride and coated on one mil thick Mylar polyester base.

*Example 2*

One-hundred (100) parts of audio grade brown iron oxide are placed with 200 parts of deionized water into a vessel equipped with a high speed attrition dissolver (Cowles dissolver). After running for one hour at 3,000 r.p.m. the iron oxide is uniformly ground to an average particle size of about three microns. The ground oxide is transferred to a jacketed reaction kettle with the aid of 100 parts additional deionized water. Five parts of potassium laureate is dissolved in the water slurry, then fifty parts of polymer grade styrene is introduced into the reaction kettle and the contents thereof stirred until the styrene is thoroughly emulsified throughout the aqueous phase. The system is then purged with nitrogen while raising the temperature to 60° centigrade. At this temperature, one part of potassium persulphate dissolved in ten parts of water is introduced into the system. The temperature of 60° centigrade is maintained for three hours under nitrogen pressure, and then raised to 85° centigrade for six hours. The contents are then discharged into 1,000 parts of cold water. The individually polystyrene-encapsulated iron oxide particles are freed of water by centrifugation and then dried in a stream of warm air. The yield is equal to 130 parts. When milled into an alcoholic solution of 45 parts of shellac, a coating composition having evenly dispersed individually encapsulated iron oxide particles is readily obtained, which can be coated without screening to give a high grade tape using Mylar (ethylene glycol terephthalate polyester), cellulose acetate, or other non-magnetic bases.

*Example 3*

One-hundred (100) parts of iron oxide particles are milled with 1,000 parts of water in a ball mill to a fineness of one to five microns particle diameter. The slurry is charged into a reactor kettle as in Example 2, and the kettle purged with nitrogen. Fifty parts of acrylonitrile are added to the reactor kettle under a nitrogen pressure. The temperature is then raised to 60° centigrade, and one part ceric sulphate dissolved in water is added. The reaction temperature is maintained at 60° centigrade for twelve hours with rapid stirring, after which time the reaction is quenched by dumping it into 5,000 parts of cold water. The polyacrylonitrile encapsulated iron oxide particles, comprising individual iron oxide particles evenly coated with polyacrylonitrile, are coagulated with twenty parts of alum. When free of water, the dried reaction product can be milled with various binder solutions to form ferromagnetic coatings suitable for high frequency recording at low tape speeds.

The individually encapsulated iron oxide particles can also be ground with plasticizers, such as tributyl citrate, to form suitable plastisols for the formation of ferromagnetic coatings.

In place of the monomers of the foregoing examples, I may use any other monomer or combinations of monomers capable of reacting in a water base ionic, free radical or redox system. For example, vinyl chloride, butadiene, methylstyrene, chlorostyrene, divinylbenzene, methyl methacrylate, ethylene glycol dimethacrylate, acrylamide, vinyl silanes, and other monomers or mixtures of such containing the vinyl grouping may be used in an aqueous solution, emulsion or dispersion system. The monomers need not be water soluble, but only need to be dispersed throughout the aqueous phase. Emulsifying agents, e.g., potassium and ammonium soaps of fatty acids, amine soaps such as morpholine oleate, alkyl aryl sulfates and sulfosuccinates, and sorbitol esters, or dispersing agents, e.g., sodium, calcium and ammonium lignosulphonates, polyglycols, and fatty acid amines, or wetting agents, or other catalysts can be used in the polymerization step if desired. If it is desired to plasticize the polymer surrounding each of the ferromagnetic, e.g., iron oxide particles, plasticizers such as chlorinated diphenyls, dimethyl phthalate, dioctyl phthalate, triethylene glycol di-2-ethylbutyrate, hexyl benzyl phosphate, tricresyl phosphate, dioctyl phthalate, dibutyl succinate, dibutoxy-ethyl adipate, dibutyl fumarate, and the like can be emulsified with the water, monomer, and catalyst system in order to obtain a plasticized polymer. It will be understood that specific plasticizers will be chosen to satisfy the needs of the particular polymer to be deposited, both as to type and amount.

In addition to the formation of homopolymers and mixed polymers (copolymers) as described above, I have found that the interfacial polymerization of polyester and polyamide type resins on the finely ground water dispersed ferromagnetic, e.g., iron oxide, particles is possible and often desirable. For example, iron oxide particles can be ground to a fine degree and dispersed in the presence of water, a water soluble reagent added to the water slurry, and the slurry then sprayed into or through a water immiscible solvent containing a second agent condensible with the water soluble reagent. For example, hexamethylene tetramine can be dissolved in a water slurry of iron oxide particles, and this slurry in turn sprayed through a toluene solution of adipyl chloride, whereupon the iron oxide particles are uniformly coated with a polyamide polymer. Other polyester and polyamide forming reagents can likewise be chosen and similarly applied according to the procedure which is well known in the art.

The ferromagnetic materials employed according to the invention may be any of the available ferromagnetic materials, such as iron oxide, finely divided iron or iron alloys, cobalt and derivatives thereof, cobalt-nickel-aluminum alloys, mixed oxides of iron and copper, and cobalt and iron oxides. In the preferred form of the invention, iron oxide particles are employed as they may be obtained in fine particle size and are readily milled.

It will be apparent to one skilled in the art that the present invention may be embodied in other specific forms without departing from the spirit or essential attributes thereof. It is, therefore, desired and intended that the embodiments herein specifically set forth be considered in all respects as illustrative and not restrictive, reference being made to the appended claims rather than the foregoing description to indicate the scope of the invention, which is to be understood as limited only by the scope of the appended claims.

I claim:

1. A method of making a magnetic impulse record member which comprises providing ferromagnetic particles, grinding said ferromagnetic particles under aqueous conditions to reduce the size of said particles, adding a polymerizable vinyl monomer to the slurry of ground ferromagnetic particles and water for encapsulating each of the particles, adding a catalyst to said slurry, agitating under polymerization conditions to form ferromagnetic particles individually encapsulated within a polymer shell, separating the encapsulated ferromagnetic particles thus formed from the water suspension, suspending said encapsulated particles in a non-magnetizable binder, applying said binder containing the encapsulated particles to a non-magnetic backing, and adheringly setting said binder on said backing.

2. The method of claim 1, wherein the ferromagnetic particles are iron oxide.

3. A magnetic impulse record member produced according to the method of claim 1.

4. A method of making a magnetic impulse record member which comprises providing ferromagnetic material, grinding said material under aqueous conditions into particles having an average particle diameter of about one to three microns and a maximum particle diameter of about seven microns, diluting the mixture containing said ground particles with additional water, adding vinyl acetate to the mixture, the weight of said vinyl acetate being less than the weight of said particles, stirring said mixture, adding a catalyst to said mixture, maintaining said mixture under polymerization and agitation conditions to form a film of polyvinyl acetate around the individual particles, separating the individually encapsulated particles from said mixture, suspending said encapsulated particles in a non-magnetizable binder, and applying said encapsulated particles and said binder to a non-magnetic backing, and adheringly setting said binder on said backing.

5. A method of making a magnetic impulse record member which comprises providing ferromagnetic material, grinding said material under aqueous conditions into particles having an average particle diameter of about one to three microns and a maximum particle diameter of about seven microns, diluting the mixture containing said ground particles with additional water, adding styrene to the mixture, the weight of said styrene being less than the weight of said particles, stirring said mixture, adding a catalyst to said mixture, maintaining said mixture under polymerization and agitation conditions to form a film of polystyrene around the individual particles, separating the individually encapsulated particles from said mixture, suspending said encapsulated particles in a non-magnetizable binder, and applying said encapsulated particles and said binder to a non-magnetic backing, and adheringly setting said binder on said backing.

6. A method of making a magnetic impulse record member which comprises providing ferromagnetic material, grinding said material under aqueous conditions into particles having an average particle diameter of about one to three microns and a maximum particle diameter of about seven microns, diluting the mixture containing said ground particles with additional water, adding acrylonitrile to the mixture, the weight of said acrylonitrile being less than the weight of said particles, stirring said mixture, adding a catalyst to said mixture, maintaining said mixture under polymerization and agitation conditions to form a film of polyacrylonitrile around the individual particles, separating the individually encapsulated particles from said mixture, suspending said encapsulated particles in a non-magnetizable binder, and applying said encapsulated particles and said binder to a non-magnetic backing, and adheringly setting said binder on said backing.

References Cited

UNITED STATES PATENTS

| | | | |
|---|---|---|---|
| 2,232,352 | 2/1941 | Verweij et al. | 91—68 |
| 2,719,009 | 9/1955 | Szegvari | 241—16 |
| 2,971,916 | 2/1961 | Schleicher et al. | 252—62.5 |
| 3,041,289 | 6/1962 | Katchen et al. | 252—62.5 |
| 3,083,118 | 3/1963 | Bridgeford | 117—47 |
| 3,139,354 | 6/1964 | Wolff | 117—121 |
| 3,200,007 | 8/1965 | Flowers | 117—138.8 |
| 3,221,315 | 11/1965 | Brown et al. | 340—174.1 |

WILLIAM D. MARTIN, *Primary Examiner.*

W. D. HERRICK, *Assistant Examiner.*